(12) United States Patent
Chen et al.

(10) Patent No.: US 9,098,355 B2
(45) Date of Patent: Aug. 4, 2015

(54) METHOD AND APPARATUS FOR SUBSTITUTING COMPILER BUILT-IN HELPER FUNCTIONS WITH MACHINE INSTRUCTIONS

(75) Inventors: Jianping Chen, Shanghai (CN); Jianhui Li, Shanghai (CN); Jinrong Gong, Shanghai (CN); Tingtao Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 13/976,515

(22) PCT Filed: Jan. 6, 2012

(86) PCT No.: PCT/CN2012/200015
§ 371 (c)(1),
(2), (4) Date: Jun. 27, 2013

(87) PCT Pub. No.: WO2013/102280
PCT Pub. Date: Jul. 11, 2013

(65) Prior Publication Data
US 2014/0196019 A1    Jul. 10, 2014

(51) Int. Cl.
*G06F 9/44* (2006.01)
*G06F 9/445* (2006.01)
*G06F 9/455* (2006.01)

(52) U.S. Cl.
CPC .............. *G06F 8/54* (2013.01); *G06F 9/4552* (2013.01)

(58) Field of Classification Search
None
See application file for complete search history.

(56) References Cited

U.S. PATENT DOCUMENTS

| | | | | |
|---|---|---|---|---|
| 5,903,772 A * | 5/1999 | White et al. | ..................... | 712/33 |
| 6,976,249 B1 * | 12/2005 | Stattenfield | ................... | 717/149 |
| 7,076,769 B2 * | 7/2006 | Baraz | ............................. | 717/136 |
| 7,516,453 B1 * | 4/2009 | Bugnion | .......................... | 718/1 |
| 7,712,092 B2 * | 5/2010 | Bansal et al. | ................. | 717/153 |
| 7,757,221 B2 * | 7/2010 | Zheng et al. | ................. | 717/136 |
| 8,255,882 B2 * | 8/2012 | Zhang et al. | ................. | 717/136 |
| 8,296,551 B2 * | 10/2012 | Bugnion | ....................... | 712/244 |

(Continued)

FOREIGN PATENT DOCUMENTS

| | | |
|---|---|---|
| TW | 2007/10731 | 3/2007 |
| TW | 2009/03328 TW | 1/2009 |

(Continued)

OTHER PUBLICATIONS

PCT Search Report and Written Opinion, PCT/CN2012/000015, mailed Sep. 20, 2012, pp. 10.

(Continued)

*Primary Examiner* — Don Wong
*Assistant Examiner* — Roberto E Luna
(74) *Attorney, Agent, or Firm* — Blakely, Sokoloff, Taylor & Zafman LLP

(57) ABSTRACT

An executable program compiled according to a source instruction set architecture (source ISA) is loaded for execution by a target instruction set architecture (target ISA)-based hardware execution unit, wherein the source and target ISA's are different. The loading includes mapping a compiler built-in helper function in the executable program to a target ISA machine instruction. The loaded program is then executed. As part of the execution, the helper function is replaced with the target ISA machine instruction to which the helper function was mapped, and the target ISA machine instruction is executed rather than the helper function.

24 Claims, 3 Drawing Sheets

(56) References Cited

U.S. PATENT DOCUMENTS

| | | |
|---|---|---|
| 2003/0126587 A1* | 7/2003 | Rosner et al. ............... 717/136 |
| 2004/0194070 A1* | 9/2004 | Baraz ........................ 717/136 |
| 2004/0268324 A1* | 12/2004 | Walker ....................... 717/138 |
| 2005/0071823 A1* | 3/2005 | Lin et al. .................... 717/136 |
| 2007/0079304 A1* | 4/2007 | Zheng et al. ................ 717/151 |
| 2008/0172657 A1* | 7/2008 | Bensal et al. ............... 717/136 |
| 2008/0201699 A1* | 8/2008 | Eichenberger et al. ...... 717/161 |
| 2008/0222623 A1* | 9/2008 | Eichenberger et al. ...... 717/160 |
| 2009/0187750 A1* | 7/2009 | Bugnion ..................... 712/244 |
| 2013/0338993 A1* | 12/2013 | Zhong et al. ................ 703/23 |

FOREIGN PATENT DOCUMENTS

| | | |
|---|---|---|
| WO | WO 2004097631 A3 * | 3/2006 |
| WO | WO-2008/120009 | 10/2008 |
| WO | WO 2008120009 A1 * | 10/2008 |

OTHER PUBLICATIONS

Taiwan International Search Report for TW Counterpart Application No. 102100241, 1 pg., (Mar. 18, 2015).

Office Action from Counterpart TW Patent Application No. 102100241, Mailed Apr. 10, 2015, 5 pages.

* cited by examiner

METHOD AND APPARATUS FOR SUBSTITUTING COMPILER BUILT-IN HELPER FUNCTIONS WITH MACHINE INSTRUCTIONS

The present patent application is a U.S. National Phase Application under 35 U.S.C. 371 of International Application No. PCT/CN2012/000015 filed Jan. 6, 2012.

BACKGROUND

Some software compilers provide built-in versions of certain functions in a corresponding software library. For example, the GNU Compiler Collection (GCC), wherein the name "GNU" is a recursive acronym for "GNU's Not Unix!", provides built-in versions of functions in the high level C software programming language standard library. That is, the implementations of the functions are written into a compiled object file, or executable file, and the program calls the built-in versions of the functions when it is executed.

A compiler may use a built-in version of a library to provide the functionality included in the high-level language source code program being compiled when there is no corresponding set of machine instructions supported by the CPU for which the program is being compiled for execution. For example, floating point operations and 64-bit integer operations may not be supported on many mobile devices. As a specific example, an ARMv5 processor, developed by ARM Holdings plc, does not include hardware floating point operations in its instruction set architecture (ISA), so compiler built-in helper functions are provided by the compiler to support floating point operations. However, another CPU, for example, the ARMv7 processor, also developed by ARM Holding plc, may include hardware floating point operations in its instruction set architecture.

An important consideration is how to migrate an application software program compiled to run on one processor that lacks the machine instructions needed to implement certain of the application's operations, and that relies on compiler built-in helper functions to provide support for such functionality, to run as efficiently as possible on another, different, processor that includes machine instructions needed to implement these certain operations.

One prior art way to migrate the application software program is to recompile the source code for the application program for a different, target ISA to replace or remove the compiler built-in helper functions, but doing so necessarily requires access to the source code for the application program, and recompiling the program every time it is migrated to a different computing platform.

Another prior art way to migrate the application software program is using binary translation. Binary translation involves emulating one instruction set by another instruction set through translation of the object code for the application software program. Object code is also commonly referred to as binary code, or executable code, or a combination of the above. In binary translation, sequences of machine language instructions are translated from a source instruction set to a target instruction set. Translation can occur at static-time, that is, the entire sequence of machine language instructions in an executable file can be converted from the source instruction set into a target instruction set without having to first run, or execute, the code. Dynamic translation involves converting short sequences, or blocks, of machine language instructions in an executable file from the source instruction set into a target instruction set, as the blocks are encountered during run time.

If a source instruction set architecture (source ISA) does not include machine instructions that support a particular functionality provided in an application program, those portions of the application program that relate to the particular functionality may be converted into appropriate compiler built-in helper functions when the application program is compiled. If the target instruction set architecture (target ISA) does include machine instructions that support the particular functionality provided in the application program, it would be beneficial when performing a binary translation of the program from the source ISA to the target ISA to convert the compiler built-in helper functions to a sequence of one or more machine instructions based on the target ISA that support the particular functionality.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
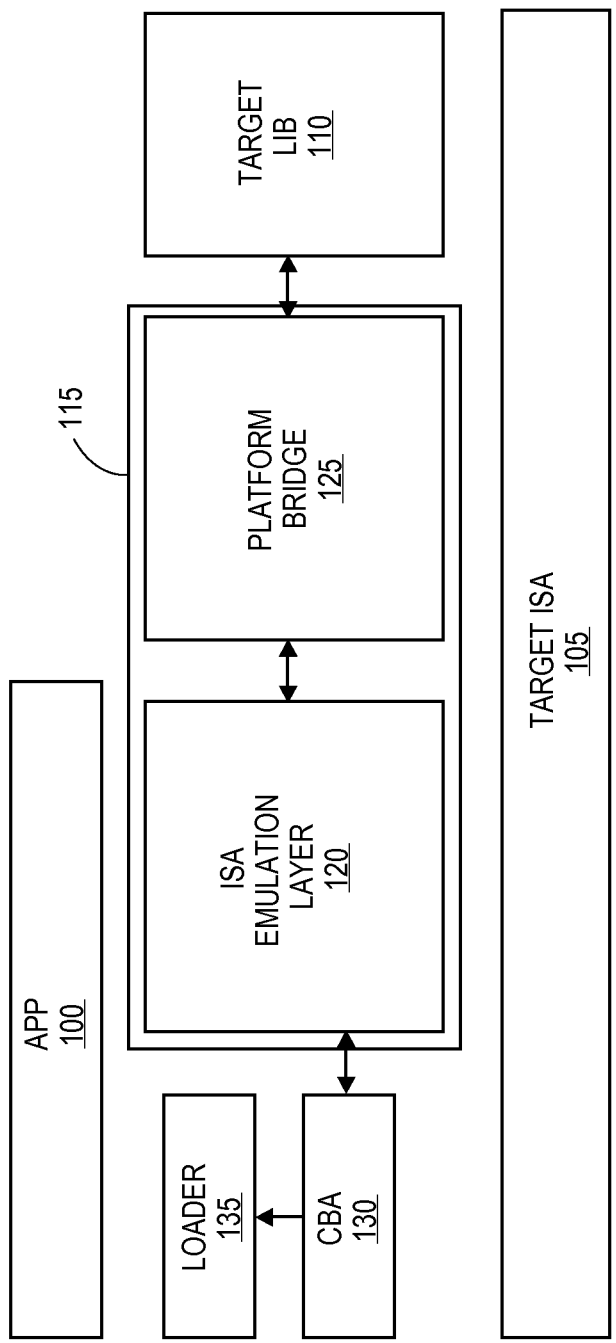
FIG. 1 is a block diagram of an embodiment of the invention.

A software application is characterized by the instruction set architecture (ISA), the operating system (OS) services, and the runtime library (LIB) that support it. With reference to FIG. 1, a dynamic runtime system 10 includes a software application 100 compiled into a sequence of machine instructions according to a source instruction set architecture (source ISA) and meant to be executed with access to a source LIB. This software application, however, can be executed, or run, on a different, target ISA 105, with access to a target LIB 110, supported by a different OS (host OS), by way of a Process Virtual Machine (PVM) 115.

A PVM, sometimes called an application virtual machine, runs as an application inside the host OS and supports a single process. The PVM is created when the process is started and ends when the process is done or exits. The PVM provides a platform-independent programming environment that abstracts away details of the underlying hardware and host OS, and allows a program to execute in the same manner on any platform. In one embodiment, the PVM is implemented using an interpreter.

PVM 115 comprises an ISA emulation layer 120 and a platform bridge 125. The ISA emulation layer 120 emulates a source ISA-based Central Processing Unit (CPU) operating on top of a target ISA-based CPU to execute the software application compiled according to the source ISA. The platform bridge 125 emulates the source LIB and handles, or accounts for, platform differences.

Figure 2:
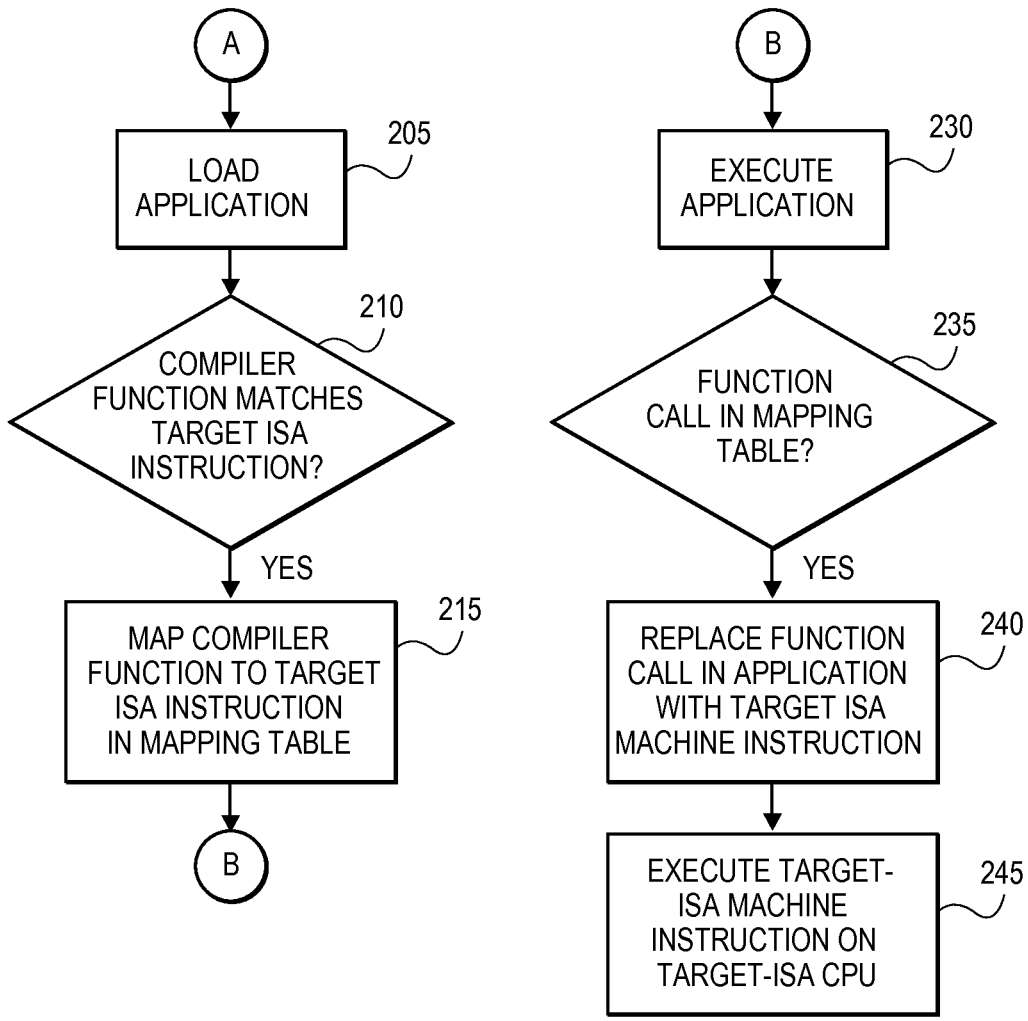
FIG. 2 is a block diagram of an embodiment of the invention.

According to an embodiment of the invention, and with further reference to the flow diagram 200 in FIG. 2, when an application program 100, in object code form, is to be executed in dynamic runtime system 10, a loader 135 loads the application for execution at 205. As part of the loading process, the loader 135 determines at 210 whether the compiler built-in helper functions (also referred to simply as "helper functions" herein) in the application 100 or target LIB 110 are semantically identical with a machine instruction in the target ISA 105. For each compiler built-in helper function that is semantically identical or similar with a machine instruction in the target ISA, the loader at 215 then records, or creates, an entry in a mapping table stored in a memory accessible to dynamic runtime system 10. In one embodiment, the mapping table is in loader 135 and is accessible to the PVM 115 and ISA emulation layer 120. The mapping table maps an address of a compiler built-in helper function to a name of a semantically identical or similar target ISA-based machine instruction. It should be noted that while loader 135 is depicted as separate from and coupled in communication with PVM 115, and in particular ISA emulation layer 120, in one embodiment, PVM 115 or ISA emulation layer 120 may include loader 135.

According to an embodiment of the invention, once the application is loaded and is in the execution stage, that is, the application is executing at 230, the ISA emulation layer 120 encounters one or more function calls in the object code. When a function call is encountered, ISA emulation layer 120 uses the address of the function call as an index to search at 235 the mapping table for a compiler built-in helper function that was added to the table during loading of the application. If the address of the function call matches the address of a compiler built-in helper function in the mapping table, the compiler built-in helper function accelerator (CBA) 130 is activated. While the embodiment illustrated in FIG. 1 depicts CBA 130 communicating with but separate from PVM 115, and in particular, ISA emulation layer 120, in one embodiment, PVM 115 or ISA emulation layer 120 may include CBA 130.

CBA 130, once activated, retrieves the name of the corresponding target ISA-based machine instruction from the entry in the mapping table that has the address of a compiler built-in helper function that matches the address of the function call encountered while the application is executing. CBA 130 then substitutes at 240 the function call in the application with the target ISA-based machine instruction. While the above description refers to a single instruction, according to one embodiment, it is contemplated that the mapping table may map a compiler built-in helper function to a plurality of target-ISA based machine instructions as may be needed to substitute the functionality of the helper function. Once CBA 130 substitutes the function call in the application with a corresponding one or more target ISA-based machine instructions, the instructions are executed at 245 directly by the target ISA-based CPU.

Figure 3:
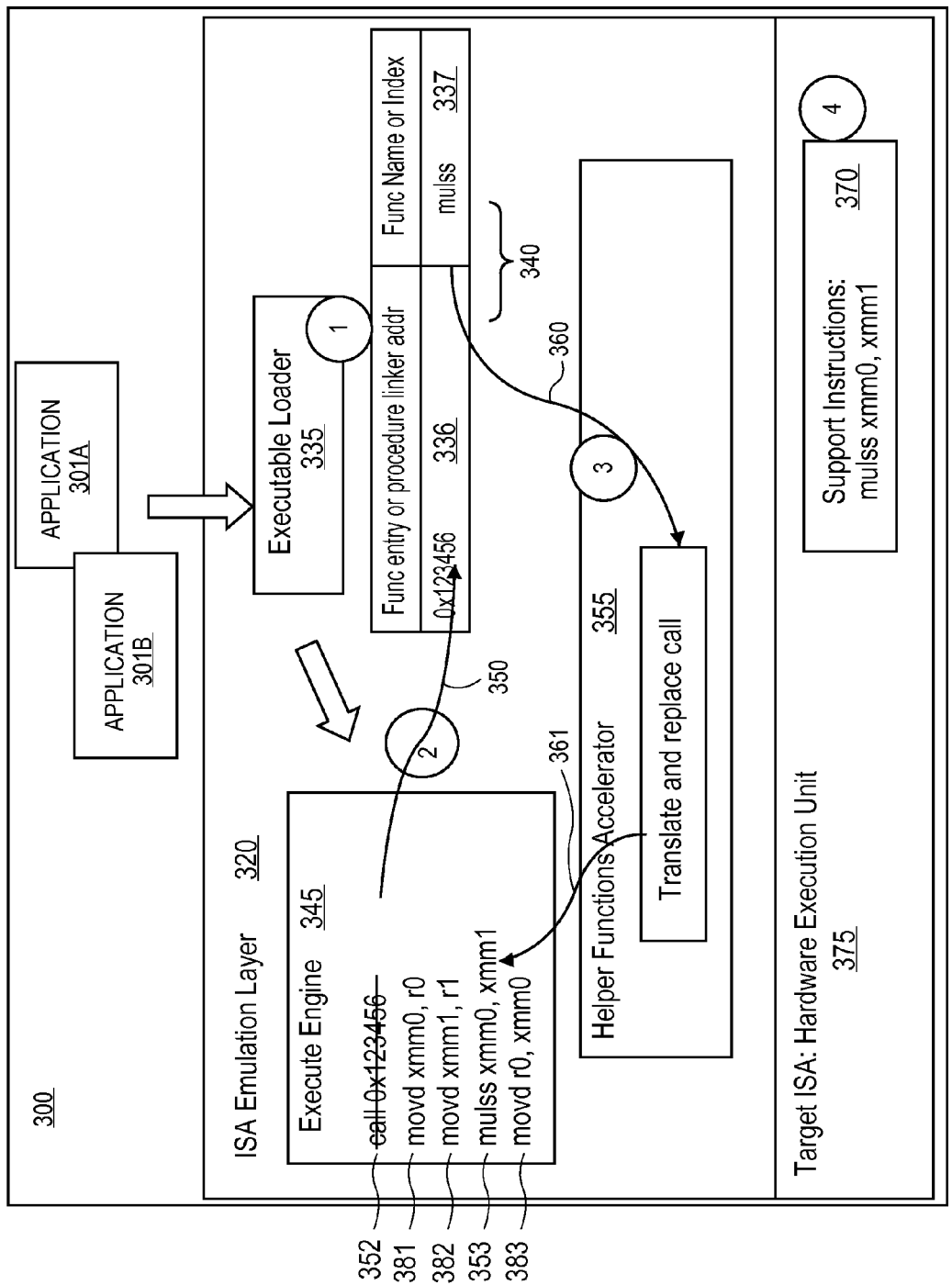
FIG. 3 is an illustration of an example embodiment of the invention.

FIG. 3 further illustrates an example embodiment 300 of the invention. Applications 301a, 301b are loaded by application loader 335. The loader 335 creates entries in the mapping table 340 for compiler built-in helper functions as they are encountered in the application by application loader 335. Each entry in the mapping table comprises an address of the function call, e.g., address 0x123456 at 336, and a name of the corresponding target ISA-based instruction that semantically matches the compiler built-in helper function, e.g., machine instruction "mulss" at 337 in the example embodiment. Compiler built-in helper functions can be compiled by static link or by dynamic link. For statically linked helper functions, through a symbol table in the executable binary file, the helper function address and function name may be recorded in the mapping table, according to one embodiment. For dynamically linked helper functions, through a procedure link table, a procedure link address and a function name may be recorded in the mapping table.

According to an embodiment of the invention, the mapping table 340 is created using the executable object code file for the software application program and any dynamically linked libraries. The mapping table provides an entry for each compiler built-in helper function, specifying the address of the function call in the executable file to the helper function or a related procedure link address with the helper function's symbol name or index. Pseudo code for creating the mapping table follows:

```
For the main executable file and dynamic linked libraries,
    For each helper function's symbol name
        {for statically linked symbol table:}
        If helper function entry can be found in the executable symbol
        table,
            a pair (function entry address, function name/index)
            are recorded into the mapping table
        {for dynamically linked symbol table:}
        If helper function is imported, find its procedure link address
            a pair (procedure link address, function name/index)
            are recorded into the mapping table
```

Once the application is loaded and the mapping table is created, the application is executed at 230 and an execution engine 345 in ISA emulation layer 320 executes at 350 a look up in the mapping table when a function call is encountered in the executable file. If the look up operation returns a valid helper function name or index, the helper function accelerator 355 is triggered. The helper function accelerator 355, once triggered, calls a built-in generation function to translate the helper function to the target ISA-based machine instructions. Translate as that term is used herein refers to a helper function that maps to at least one target ISA-based instruction in the mapping table. Translation may also involve one or more additional target ISA-based instructions to be inserted into the executable file in order for the mapped target ISA-based instruction to execute correctly. For example, data may need to be read and/or written to or from one or more registers or memory locations prior to or after execution of the mapped target ISA-based instruction, and the instructions necessary to carry out those steps are also inserted into the executable when the function call is substituted.

As illustrated in FIG. 3, the address of the function call encountered by the execution engine is located at 350 in mapping table 340, and the function call is translated and replaced (as indicated by the function call being lined through in FIG. 3 at 352, and the corresponding instruction, "mulss" inserted in the executable as indicated at 360 and 361). Additional instructions, such as the "movd xmm0, r0" instruction at 381, "movd xmm1, r1" at 382, and the "movd r0, xmm0" at 383, are also inserted by accelerator 355 at 361 as needed to provide the appropriate parameters or variables upon which the target ISA-based machine instruction, in this example, the "mulss xmm0, xmm1" instruction, operates. Finally, at 370, the target ISA-based CPU or hardware execution unit 375 executes the translated target ISA machine instruction, in this example, "mulss xm0, xmm1" as well as any additional target ISA instructions inserted by execution engine 320, as described above.

In this description, numerous details have been set forth to provide a more thorough explanation of embodiments of the present invention. It should be apparent, however, to one skilled in the art, that embodiments of the present invention may be practiced without these specific details. In other instances, well-known structures and devices have been shown in block diagram form, rather than in detail, in order to avoid obscuring embodiments of the present invention.

Some portions of this detailed description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "loading" or "activating" or "triggering" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, or transmission devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The structure for a variety of these systems appears from the description herein. In addition, embodiments of the present invention are not described with reference to any particular programming language. It will be appreciated that a variety of programming languages may be used to implement the teachings of the invention as described herein.

A machine-readable medium includes any mechanism for storing information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that recite only those features regarded as essential to the invention.

What is claimed is:

1. A method, comprising:
loading an executable program comprising a sequence of machine instructions compiled according to a source instruction set architecture (source ISA) for execution by a target instruction set architecture (target ISA)-based hardware execution unit, the loading including mapping a compiler built-in helper function ("helper function") in the executable program to a target ISA machine instruction; and
executing the loaded program, the executing comprising replacing the helper function with the target ISA machine instruction to which the helper function was mapped by:
retrieving the target ISA machine instruction from a mapping table entry that includes an address of a helper function that matches an address of the function call encountered in the executing program; and
replacing the function call in the executing program with the retrieved target ISA machine instruction; and
executing the target ISA machine instruction.

2. The method of claim 1, wherein the source ISA is different from a target ISA for the target ISA-based hardware execution unit.

3. The method of claim 1, wherein mapping the helper function comprises determining whether the helper function is semantically similar with a target ISA machine instruction.

4. The method of claim 3 wherein replacing the helper function with the target ISA machine instruction to which the helper function was mapped comprises replacing the helper function with the target ISA machine instruction with which the helper function is semantically similar.

5. The method of claim 4, wherein determining whether the helper function is semantically similar with a target ISA machine instruction comprises determining whether the helper function is semantically identical with a target ISA machine instruction.

6. The method of claim 3, wherein mapping the helper function to the target ISA machine instruction comprises creating an entry in a mapping table in a memory accessible to a program loader performing the loading, the entry mapping an address of the helper function to a name of the semantically similar target ISA machine instruction.

7. The method of claim 1, wherein replacing the helper function with the target ISA machine instruction to which the helper function was mapped comprises determining whether a function call encountered in the executing program is a helper function mapped to a target ISA machine instruction in the mapping table.

8. The method of claim 7, wherein determining whether a function call encountered in the executing program is a helper function mapped to a target ISA machine instruction in the mapping table comprises searching for an entry in the mapping table that includes an address of a helper function that matches an address of the function call.

9. The method of claim 1, further comprising inserting additional target ISA machine instructions in the executing program in conjunction with the retrieved target ISA machine instruction as may be needed for the retrieved target ISA machine instruction to execute.

10. The method of claim 1, wherein executing the target ISA machine instruction comprises executing the target ISA machine instruction by the target ISA-based hardware execution unit.

11. An apparatus, comprising:
a processor to execute;
an object code loader to load object code compiled according to a source instruction set architecture (source ISA) for execution on a target instruction set architecture (target ISA)-based platform, including the loader to map a compiler built-in helper function ("helper function") in the object code to a target ISA machine instruction; a helper function replacement module to replace the helper function with the target ISA machine instruction to which the helper function was mapped by retrieving the target ISA machine instruction from a mapping table entry that includes an address of a helper function that matches an address of the function call encountered in the executing program and replacing the function call in the executing program with the retrieved target ISA machine instruction; and
an execution engine to execute the loaded object code, including the target ISA machine instruction that replaced the helper function.

12. The apparatus of claim 11, wherein the loader to map the helper function comprises the loader to determine whether the helper function is semantically similar with a target ISA machine instruction.

13. The apparatus of claim 12 wherein the helper function replacement module to replace the helper function with the target ISA machine instruction to which the helper function was mapped comprises the module to replace the helper function with the target ISA machine instruction with which the helper function is semantically similar.

14. The apparatus of claim 12, wherein the loader to map the helper function in the object code to a target ISA machine instruction comprises the loader to create an entry in a mapping table, the entry mapping an address of the helper function to the semantically similar target ISA machine instruction.

15. The apparatus of claim 11, wherein the helper function replacement module to replace the helper function with the target ISA machine instruction to which the helper function was mapped comprises the module to determine whether a function call encountered in the executing program is a helper function mapped to a target ISA machine instruction in the mapping table.

16. The apparatus of claim 14, wherein the loader to create an entry in a mapping table, the entry mapping an address of the helper function to the semantically similar target ISA machine instruction, comprises the loader to create an entry in a mapping table that maps an address of a statically linked helper function to the semantically similar target ISA machine instruction, the address obtained from a symbol table in the object code.

17. The apparatus of claim 14, wherein the loader to create an entry in a mapping table, the entry mapping an address of the helper function to the semantically similar target ISA machine instruction, comprises the loader to create an entry in a mapping table that maps an procedure link address of a dynamically linked helper function to the semantically similar target ISA machine instruction, the procedure link address obtained from a procedure link table in the object code.

18. A computer program product comprising:
a non-transitory computer-readable medium; and
instructions in the computer-readable medium, wherein the instructions, when executed in a dynamic runtime system, cause the system to perform operations comprising:
loading an executable program comprising a sequence of machine instructions compiled according to a source instruction set architecture (source ISA) for execution by a target instruction set architecture (target ISA)-based hardware execution unit, the loading including mapping a compiler built-in helper function ("helper function") in the executable program to a target ISA machine instruction; and
executing the loaded program, the executing comprising replacing the helper function with the target ISA machine instruction to which the helper function was mapped by:
retrieving the target ISA machine instruction from a mapping table entry that includes an address of a helper function that matches an address of the function call encountered in the executing program; and
replacing the function call in the executing program with the retrieved target ISA machine instruction; and
executing the target ISA machine instruction.

19. The computer program product of claim 18, wherein mapping the helper function comprises determining whether the helper function is semantically similar with a target ISA machine instruction.

20. The computer program product of claim 19, wherein replacing the helper function with the target ISA machine instruction to which the helper function was mapped comprises replacing the helper function with the target ISA machine instruction with which the helper function is semantically similar.

21. The computer program product of claim 19, wherein mapping the helper function to the target ISA machine instruction comprises creating an entry in a mapping table in a memory accessible to a program loader performing the loading, the entry mapping an address of the helper function to a name of the semantically similar target ISA machine instruction.

22. The computer program product of claim 18, wherein replacing the helper function with the target ISA machine instruction to which the helper function was mapped comprises determining whether a function call encountered in the executing program is a helper function mapped to a target ISA machine instruction in the mapping table.

23. The computer program product of claim 22, wherein determining whether a function call encountered in the executing program is a helper function mapped to a target ISA machine instruction in the mapping table comprises searching for an entry in the mapping table that includes an address of a helper function that matches an address of the function call.

24. The computer program product of claim 23, wherein replacing the helper function with the target ISA machine instruction comprises retrieving the target ISA machine instruction from the mapping table entry that includes the address of a helper function that matches the address of the function call encountered in the executing program and replacing the function call in the executing program with the retrieved target ISA machine instruction.

* * * * *